United States Patent Office 3,331,774
Patented July 18, 1967

3,331,774
GREASE COMPOSITIONS
Anthony Joseph Saraceno, Devon, Pa., assignor to Pennsalt Chemicals Corporation, Philadelphia, Pa., a corporation of Pennsylvania
No Drawing. Filed Aug. 13, 1965, Ser. No. 479,630
7 Claims. (Cl. 252—32.5)

This invention deals with improved greases and is particularly concerned with greases made from diester fluids. Ester base greases are known and are conventionally prepared by adding a thickening agent such as a lithium soap to an ester fluid; e.g. sebacate, adipate, and azelate esters. In preparing such greases the amount of additive used has been rather high, being on the order of about 20% by weight of the total grease composition. The use of such a high amount of additives is undesirable from an economic standpoint where the additive is expensive, and also because large amounts of the additive frequently adversely affect the lubricant and grease properties desired.

It has now been found that improved ester based greases can be prepared by incorporating a diester of the above types, a thickening amount of a relatively low molecular weight chromium phosphinate copolymer. More specifically, the invention comprises a diester fluid containing a thickening amount of a copolymer having an intrinsic viscosity below about 1.0 and consisting of a doubly bridged chromium atom coordinated with a hydroxyl group and a water molecule, characterized by having at least two different bridging groups wherein each bridging group is the anion of an acid $R_2P(O)OH$, where R is hydrocarbon alkyl or aryl containing from 1 to 10 carbon atoms and with the proviso that at least one bridging group contains at least one alkyl group, and said copolymer being terminated at its ends by the anion of an aliphatic carboxylic acid containing from one to four carbon atoms. Thus, the copolymers defined above may be considered as copolymers having different repeating units and represented by the formula:

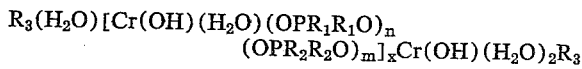

where $R_1$ and $R_2$ are hydrocarbonalkyl or aryl containing from one to ten carbon atoms with the proviso that at least one of the R groups is alkyl, $R_3$ is the anion of an aliphatic carboxylic acid containing from one to four carbon atoms (e.g., formate, acetate, propionate, and butyrate), and where it is understood that the repeating units are random in nature. It will also be understood that $n$ and $m$, which are not necessarily integers, may vary, although the sum of $n$ and $m$ will be two in order to satisfy the valence requirements of the chromium atom. The symbol $x$ merely indicates the polymeric nature of the formula shown.

The copolymers as defined thus contain at least one alkyl group in one of the repeating units of the polymer and this is a requirement for making the greases of the invention. If the $R_1$ and $R_2$ groups are all aryl groups a suitable grease cannot be prepared because the copolymer is incompatible with the diester fluid causing separation of the components. The presence of at least one alkyl group in a repeating unit of the polymer contributes properties to the copolymer which do enable it to be useful for making the greases of the invention. The intrinsic viscosity limitation of below about 1.0 in chloroform is significant also in that if the copolymer has an intrinsic viscosity much above this value, the copolymers are incompatible with the diester fluid and a satisfactory grease cannot be prepared.

The inorganic polymers are described above are disclosed and claimed in application Ser. No. 382,924, now U.S. Patent 3,275,574, filed in the name of Anthony J. Saraceno on July 15, 1964, and are particularly described in Example 9 of that application. In accord with the procedure described there, chromous acetate monohydrate, or other chromous aliphatic acid salt hydrate, is reacted by refluxing it in water with the appropriate phosphinic acids and the intermediate product is then oxidized with air. In carrying out this procedure, the amount of phosphinic acid used will be slightly less stoichiometrically than the amount of chromous salt, and in this way the polymer that is obtained will be terminated (i.e., end-capped) by the anion of the aliphatic acid as discussed above. In a preferred procedure, the reaction product between the phosphinic acid mixture and the chromous salt is oxidized in a mixed solvent system consisting of tetrahydrofuran and water such as described in copending application of J. P. King S.N. 479,631, filed of even date herewith. Examples of the copolymers which may be used to form greases in accordance with this invention are as follows:

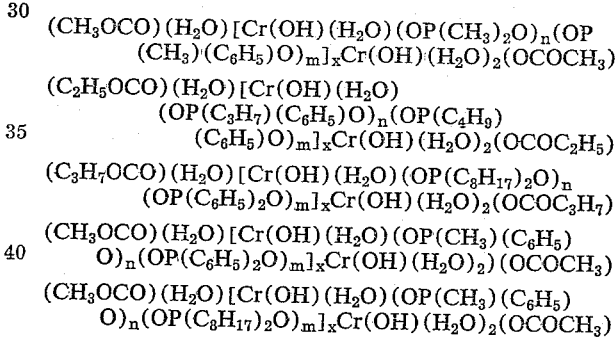

and the like. It will be understood also that the two bridging groups in each repeating unit need not be the same. Such an arrangement in the repeating units making up the polymer will result because of the random nature of the repeating units in the polymer obtained.

The diester fluid which will be converted to a grease in accord with the invention will be selected from the group of sebacates, azelates, and adipates where the alcohol portion of the ester is derived from a primary or oxo alcohol containing from 8 to 10 carbon atoms. Such diesters are described on page 156 et seq. of the book "Synthetic Lubricants" authored by Gunderson and Hart and published by Reinhold, 1962. Some of the more important diester fluids include the following diesters of sebacic, azelaic, and adipic acids: di(2-ethylhexyl)-, di($C_8$oxo)-, di($C_9$oxo)-, di(3,5,5-trimethylhexyl)-, di($C_{10}$oxo)-, and the like.

The preparation of greases in accord with the invention is straightforward and requires only that the copolymer be added to the diester fluid and the mixture heated with stirring, preferably under an inert atmosphere, usually nitrogen, until the mixture sets to the consistency of the desired grease. The usual milling procedures used for grease formation may be employed. In an alternate procedure, the diester fluid may be used as a solvent for preparation of the chromium phosphinate copolymer, in which procedure the polymerization of the chromium phosphinate intermediate is carried out by dispersing it in the fluid and permitting oxidation to occur. In the preparation of the greases, the heating time has some effect upon the dropping point of the grease obtained in that, in general, a grease with higher dropping point may be obtained by employing a longer heating time during the mixing of the copolymer with the diester.

The amount of copolymer additive used to form a grease from the diester fluid is relatively small in comparison with the amounts of additives generally employed heretofore. In prior art techniques an amount of additive on the order of about 20% is generally required to give a suitable grease. On the other hand, in accord with this invention, smaller amounts of the copolymer additive are used and grease formation has been achieved successfully with from about 5% to about 15% by weight. Generally, the higher the amount of additive used, the higher the dropping point of the grease. For greases with low viscosity the lower amount of copolymer will be used. The greases made in accordance with the invention have excellent properties and can withstand long term exposure at elevated temperatures without degradation. The greases have little tendency to bleed, are workable at room temperature, and show no effects of catalytic degradation due to interaction between the lubricant and additive. In order to further illustrate the invention the following examples are given:

*Example 1*

Five parts by weight of the copolymer of structure $(CH_3OCO)(H_2O)[Cr(H_2O)(OH)(OP(CH_3)$
$(C_6H_5)O)_{0.8}(OP(C_8H_{17})_2$
$O)_{1.2}]_8Cr(OH)(H_2O)_2(OCOCH_3)$ was added to 45 parts by weight of di(2-ethylhexyl) sebacate fluid under nitrogen using magnetic stirring. The suspension was heated to 250° F. until grease formation occurred. The grease was cooled under nitrogen and was ready for use.

*Example 2*

Following the procedure in Example 1, the following diester greases were prepared and are shown in Table I.

TABLE I.—GREASES PREPARED WITH DI(2-ETHYLHEXYL)SEBACATE BY INCORPORATION OF COPOLYMER OF FORMULA

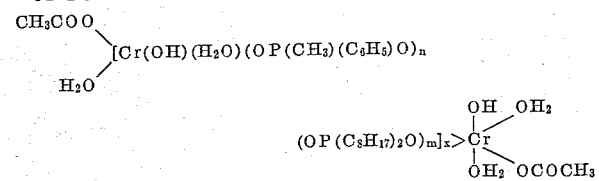

| n | m | x | Intrinsic viscosity | Percent by weight concentration of copolymer | Dropping point, ° F. (ASTM) | 250° F. Heating time (hours) |
|---|---|---|---|---|---|---|
| 0.8 | 1.2 | 8 | 0.18 | 5 | (1) | 2 |
| 0.8 | 1.2 | 8 | 0.18 | 10 | 269 | 1 |
| 0.8 | 1.2 | 8 | 0.18 | 10 | 322 | 288 |
| 1.1 | 0.9 | 11 | 0.29 | 10 | 331 | 0.5 |
| 1.1 | 0.9 | 11 | 0.29 | 10 | 386 | 72 |
| 1.33 | 0.67 | 38 | 0.32 | 10 | 335 | 0.5 |

¹ Very viscous oil at room temperature.

*Example 3*

Five parts by weight of $(HCOO)(H_2O)[Cr(H_2O)(OH)(OP(C_8H_{17})_2O)_{1.2}$
$(OP(C_6H_5O)_2)_{0.8}]_{10}Cr(OH)(H_2O)_2(OOCH)$ having an intrinsic viscosity of about 0.15 was added to 45 parts by weight of dioctyl adipate fluid under nitrogen using magnetic stirring. The suspension was heated to 250° F. until grease formation occurred and subsequently cooled under nitrogen.

*Example 4*

Following the procedure of Example 3, a grease with didecyl azelate was prepared.

I claim:
1. A grease composition comprising a diester selected from the group of sebacates, azelates and adipates where the alcohol portion of the ester is derived from an alcohol containing 8 to 10 carbon atoms and selected from the class consisting of primary and oxo alcohols and a thickening amount of a copolymer having an intrinsic viscosity below about 1.0 and consisting of a doubly bridged chromium atom coordinated with a hydroxyl group and a water molecule, said copolymer characterized by having at least two different bridging groups wherein each bridging group is the anion of an acid $R_1R_2P(O)OH$, where $R_1$ and $R_2$ contain from 1 to 10 carbon atoms and are selected from the group consisting of alkyl and aryl, and with the proviso that at least one bridging group contains at least one alkyl group, and said copolymer being terminated at its ends by the anion of an aliphatic carboxylic acid containing from one to four carbon atoms.

2. A grease composition comprising a diester of a sebacate where the alcohol portion of the ester is derived from a primary or oxo alcohol containing from 8 to 10 carbon atoms and from about 5% to about 15% by weight of a copolymer having an intrinsic viscosity below about 1.0 and consisting of a doubly bridged chromium atom coordinated with a hydroxyl group and a water molecule, said copolymer characterized by having at least two different bridging groups wherein each bridging group is the anion of an acid $R_1R_2P(O)OH$, where $R_1$ and $R_2$ contain from 1 to 10 carbon atoms and are selected from the group consisting of alkyl and aryl, and with the proviso that at least one bridging group contains at least one alkyl group, and said copolymer being terminated at its ends by the anion of an aliphatic carboxylic acid containing from one to four carbon atoms.

3. A grease composition as in claim 2 where the diester is di(2-ethylhexyl)sebacate and the copolymer is one where one bridging group is the anion of methylphenylphosphinic acid, a second bridging group is the anion of dioctylphosphinic acid and the copolymer is terminated with acetate anions.

4. A grease composition comprising a diester of an adipate where the alcohol portion of the ester is derived from a primary or oxo alcohol containing from 8 to 10 carbon atoms and from about 5% to about 15% by weight of a copolymer having an intrinsic viscosity below about 1.0 and consisting of a doubly bridged chromium atom coordinated with a hydroxyl group and a water molecule, said copolymer characterized by having at least two different bridging groups wherein each bridging group is the anion of an acid $R_1R_2P(O)OH$, where $R_1$ and $R_2$ contain from 1 to 10 carbon atoms and are selected from the group consisting of alkyl and aryl, and with the proviso that at least one bridging group contains at least one alkyl group, and said copolymer being terminated at its ends by the anion of an aliphatic carboxylic acid containing from one to four carbon atoms.

5. A grease composition as in claim 4 where the diester is dioctyladipate and the copolymer is one where one briging group is the anion of diphenylphosphinic acid, a second bridging group is the anion of dioctylphosphinic acid and the copolymer is terminated with acetate anions.

6. A grease composition comprising a diester of an azelate where the alcohol portion of the ester is derived from a primary or oxo alcohol containing from 8 to 10 carbon atoms and from about 5% to about 15% by weight of a copolymer having an intrinsic viscosity below about 1.0 and consisting of a doubly bridged chromium atom coordinated with a hydroxyl group and a water molecule, said copolymer characterized by having at least two different bridging groups wherein each bridging group is the anion of an acid $R_1R_2P(O)OH$, where $R_1$ and $R_2$ contain from 1 to 10 carbon atoms and are selected from the group consisting of alkyl and aryl, and with the proviso that at least one bridging group contains at least one alkyl group, and said copolymer being terminated at its ends by the anion of an aliphatic carboxylic acid containing from one to four carbon atoms.

7. A grease composition as in claim 6 where the diester is didecylazelate and the copolymer is one where one bridging group is the anion of diphenylphosphinic acid, a second bridging group is the anion of dioctylphosphinic acid and the copolymer is terminated with acetate anions.

References Cited

UNITED STATES PATENTS

| | | | |
|---|---|---|---|
| 2,976,238 | 3/1961 | Elliott et al. | 252—32.5 |
| 3,197,436 | 7/1965 | Block et al. | 260—2 |

DANIEL E. WYMAN, *Primary Examiner.*

I. VAUGHN, *Assistant Examiner.*